Oct. 26, 1954  F. S. ELSAESSER  2,692,628
RADISH CUTTER FOR PRODUCING RADISH ROSETTES
Filed May 5, 1947  2 Sheets-Sheet 1
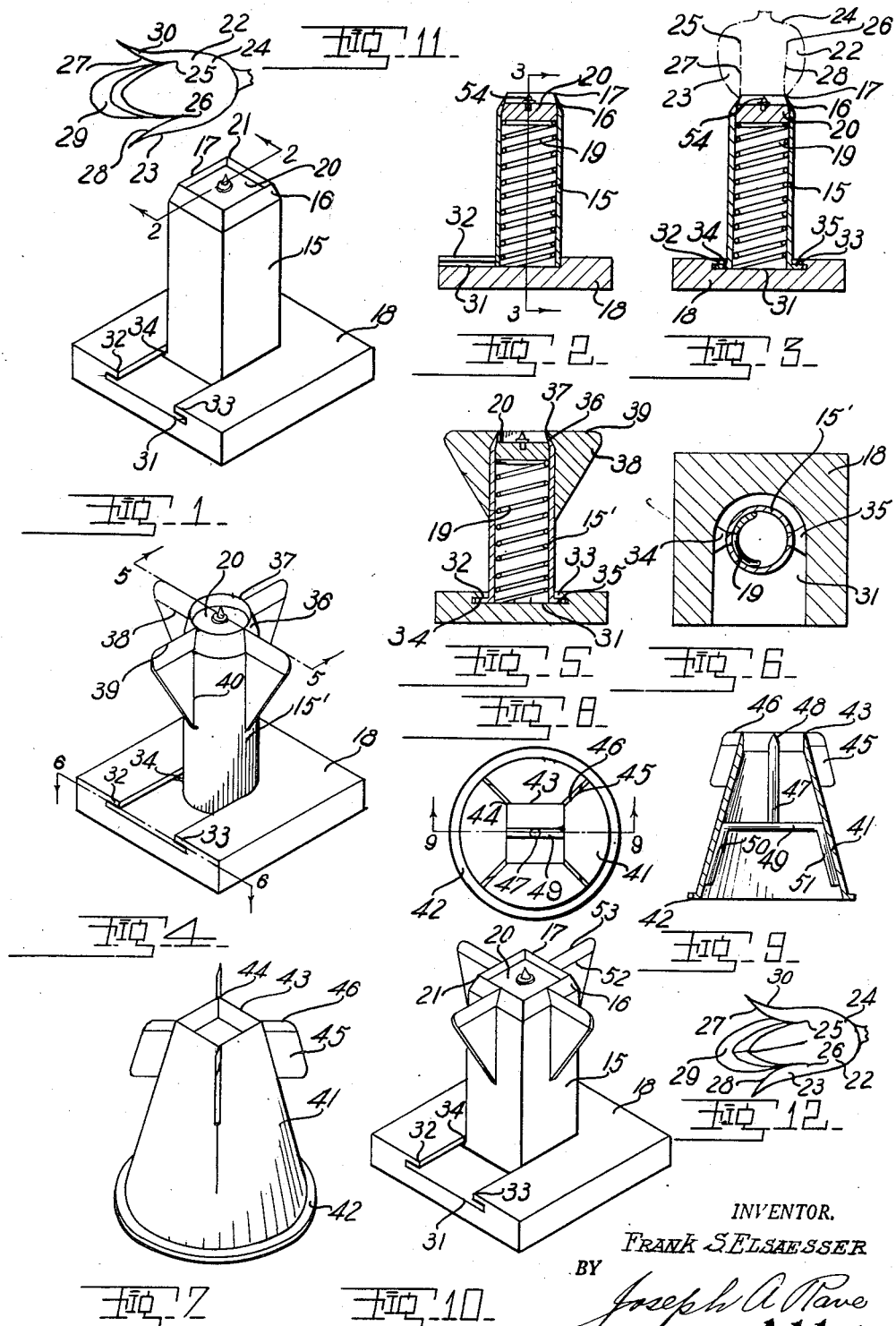
INVENTOR.
FRANK S. ELSAESSER
BY
Joseph A. Pave
Atty.

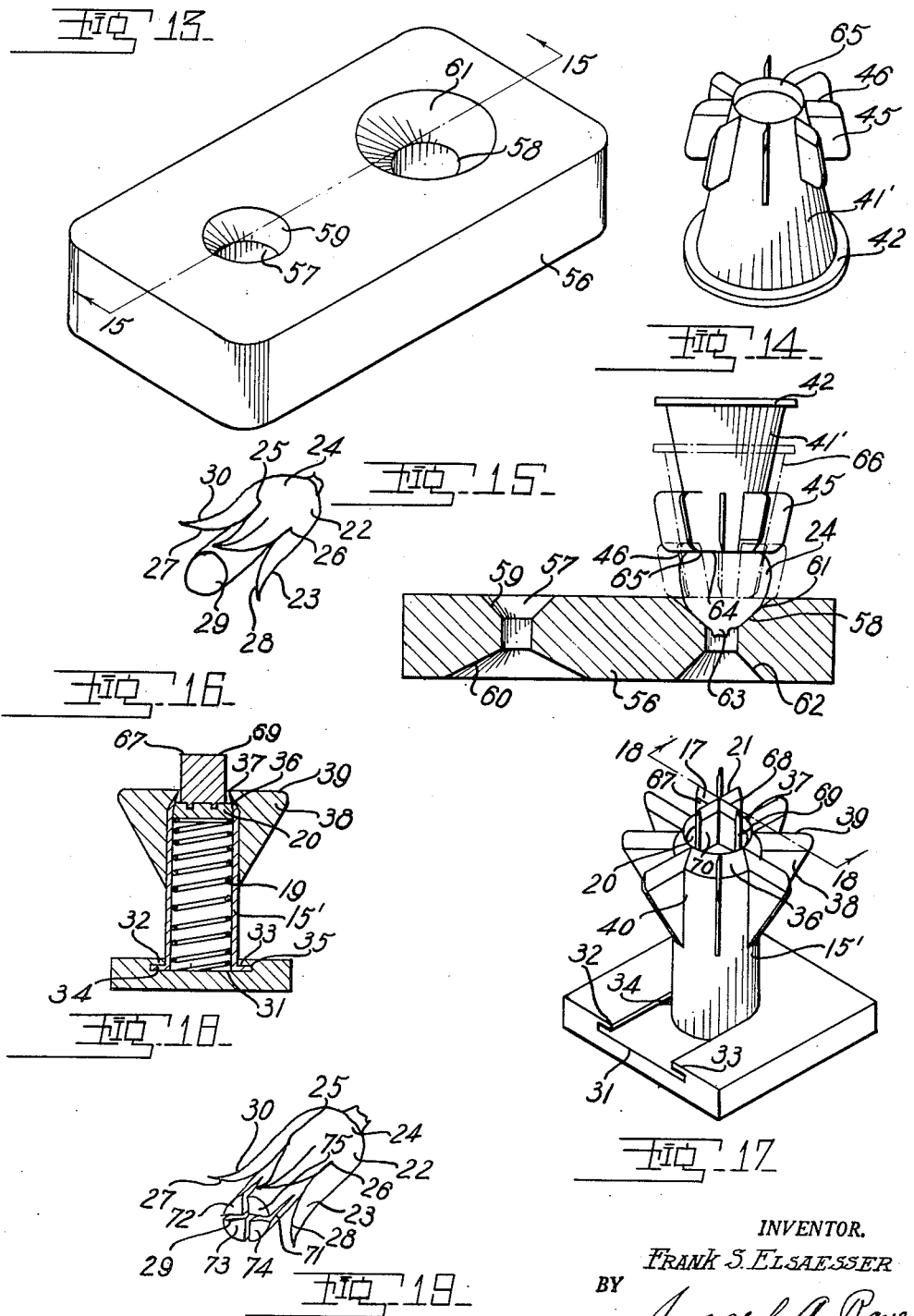

Patented Oct. 26, 1954

2,692,628

UNITED STATES PATENT OFFICE 2,692,628

RADISH CUTTER FOR PRODUCING RADISH ROSETTES

Frank S. Elsaesser, Cincinnati, Ohio

Application May 5, 1947, Serial No. 745,953

15 Claims. (Cl. 146—40)

1

This invention relates to improvements in a kitchen implement particularly to a cutter for cutting radishes which are used for garnishment purposes and the like.

It has been customary to slit radishes along their sides thereby providing a radish having a central core with leaf-like sections along each side of the core. The cut radish upon being placed in water has the said thin leaf-like sections outwardly flared thereby giving the radish the appearance of a flower such as a "rose" with the center forwardly projecting and the thin leaf-like section outwardly curving or curling in the nature of petals. It has been the practice to effect the cutting by means of the ordinary kitchen or paring knife.

This method of preparing radishes is quite time consuming particularly in restaurants where large quantities of the radishes are prepared. Furthermore with the use of the kitchen or paring knife the final appearance of the cut radish depends upon the skill of the operator and the results where frequently anything but uniform. By the implement of the present invention the foregoing difficulties have been overcome and the radish properly cut in an expeditious manner and with uniform results.

It is, therefore, the principal object of the present invention to provide a radish cutter or implement for cutting the radish to resemble a flower such as a "rose."

Another object of the present invention is the provision of a radish cutter or implement for accomplishing the foregoing object that is extremely simple in construction and economical to produce and acquire.

A further object of the present invention is the provision of a radish cutter or implement that is efficient in operation and simple to use.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 1 is a perspective view of a radish cutter or implement embodying the principles of the present invention and illustrating one modification of the same.

Fig. 2 is a vertical sectional view through the radish cutter or implement as seen from line 2—2 on Fig. 1.

Fig. 3 is a vertical central sectional view of the cutter or implement of Fig. 1 taken at right angles to the section of Fig. 2 on line 3—3 on said Fig. 2.

Fig. 4 is a perspective view of a radish cutter or implement similar to Fig. 1 showing a modification in the construction.

Fig. 5 is a vertical central sectional view of the cutter or implement of Fig. 4 as seen from line 5—5 on said Fig. 4.

Fig. 6 is a horizontal sectional view through a base of the cutter or implement as seen from line 6—6 on Fig. 4.

Fig. 7 is a perspective view of a simplified form of the cutter or implement representing a modification over Figs. 1 and 4.

Fig. 8 is a top plan view of a cutter or implement similar to Fig. 7 but showing a further modification in the implement of Fig. 7.

Fig. 9 is a vertical central sectional view through the implement of Fig. 8 as seen from line 9—9 on said Fig. 8.

Fig. 10 is a perspective view of a radish cutter or implement similar to Fig. 1 but showing a modification in the form of the cutter or implement of said Fig. 1.

Fig. 11 is a perspective view of a radish after the same has been cut by the cutter or implement of the present invention.

Fig. 12 is a perspective view of a radish after having been cut by the cutter or implement of Fig. 10.

Fig. 13 is a perspective view of a base or support for a radish to be used with the cutter of the present invention.

Fig. 14 is a perspective view of a cutter similar to that shown in Fig. 7 but illustrating a further modification in the cutter.

Fig. 15 is a longitudinal sectional view through the radish support of Fig. 13 taken on line 15—15 on said Fig. 13 and illustrating the cutter of Fig. 14 in operation relative thereto.

Fig. 16 is a perspective view of a radish as cut or formed with the cutter of Fig. 14.

Fig. 17 is a view of a cutter similar to that illustrated in Fig. 4 disclosing a further modification in the cutter.

Fig. 18 is a vertical sectional view of the modified cutter of Fig. 17 taken on line 18—18 on said Fig. 17.

Fig. 19 is a perspective of a radish cut or formed with the cutter of Figs. 17 and 18.

Throughout the several views of the drawings similar reference characters are employed to denote the same or similar parts.

The radish cutter or implement of the present invention essentially comprises a hollow tube or body member 15 which may have its sides truly vertical whether rectangular as in Fig. 1, circular as in Fig. 4 or inclined as in Figs. 7 and 9. As illustrated in Figs. 1, 2 and 3 the tube or body member of the cutter or implement is rectangular in cross section and has the upper ends of its sides swaged, ground or otherwise formed as a taper as at 16 to provide at the top thereof a keen sharp edge 17 which acts as the cutting knives.

The tube or body member 15 is adapted to be secured to and upstands from a suitable base 18. In the form illustrated in Figs. 1, 2 and 3 there is disposed interiorly of the tube or body member 15 a coiled spring 19 which has its lower end resting on the base 18 and its upper end secured to a plunger 20. The spring 19 is comparatively light but is under tension and has sufficient force to normally hold the plunger 20 at the upper end of the tube or body member 15. As seen in Figs. 2 and 3 by slightly inwardly bending or forming the upper end 16, a suitable abutment is provided for limiting the movement of the plunger 20 under the force of the spring 19.

The rectangular cross sectional tube or body portion 15 provides corners 21 between which extends the keen or sharp edges 17 and which corners 21 act to separate into, so called, leaves the material or portion of the radish that is exteriorly thereof.

In operation a radish 22, which has its body portion of a major diameter greater than the transverse dimension of the tube or body portion 15, is selected and its root removed. The root end of the radish is placed against the plunger 20 while the radish is being held by the fingers of the operator. Downward movement of the radish causes the knives or sharp edges 17 to slice that portion 23 thereof, which overhangs or projects beyond the said keen edges or knives 17. Continued downward movement of the radish 22 is effected until the top 24 of the radish is the desired distance away from the said knives or keen edges 17. As illustrated in Fig. 3 this downward movement continues to the upper ends 25 and 26 of dash lines 27 and 27 respectively. The lines 27 and 28 represent the cuts effected in the over hanging portion 23 of the radish by the corners 21 at the ends of the knives or sharp edges 17.

The operator in actuating the radish as above described compresses the spring 19, since the plunger 20 is downwardly moved during the downward movement of the radish, and upon release of downward movement or pressure the spring 19 expands thereby outwardly pushing the radish 22. As will later be made clear this is not absolutely necessary but the plunger 22 does eject the radish from the tube or body portion 15 after the cut has been completed and downward pressure removed therefrom.

The radish 22 after being cut is laid aside and preferably placed in cold water to prevent its wilting. Within a short time the cut radish takes the form illustrated in Fig. 11 having a central projecting portion 29 with four petals 30 each outwardly flaring or curving from the top 24 of the radish. As will be readily understood the petals 30 are formed from the portion 23, slit from the body of the radish, and divided by the cuts 27 and 28 therein, as effected by the corners 21 of the cutter or implement tube or body portion 15.

It has been found that a radish some times tilts on the plunger 20, in other words, the radish end slides while being started against the knives or sharp edges 17, resulting in the petals 30 having dissimilar thickness. In order to prevent this use is made of a centering pin 54 secured in the plunger 20 and having a sharp point 55 projecting from the plunger. In use the centering pin 55 enters the end of the radish immediately and thereby prohibits any lateral movement of the radish on the plunger 20.

In view of the fact that during the process of cutting the radish a certain amount of moisture will flow into the tube or body portion 15, it is desirable that the parts be separable from one another for cleaning and drying purposes for which reason the tube or body portion 15 should be separable from its base. Any suitable or desirable means may be employed for this purpose. As shown in the drawings the separation of the cutter or implement base 18 may be provided with a T slot 31 having flanges 32 and 33 overlying the upper face of the T slot 31. The tube or body member 15 is then provided with outwardly disposed lugs 34 and 35 which cooperate with the T slot by underlying its flange 32 and 33.

When it is desired to clean or dry the cutter or implement the tube or body portion 15 is actuated to the left as seen in Fig. 1 thereby separating the parts, and the spring 19 together with its plunger 20 can be removed from the tube through its open lower end. After suitable cleaning and sterilizing the parts are reassembled, the user exerting a slight pressure on the bottom of the spring 19 to position same within the tube or body portion 15 until the said tube is over the upper surface of the T slot 31 whereupon the spring will be retained in its enclosed position and the tube or body member pushed to its final operating position.

As noted above the tube or body portion 15 of Figs. 1, 2 and 3 is rectangular in cross section while the tube or body portion 15' of Figs. 4, 5 and 6 is circular in cross section. The upper end of the tube or body portion 15' is tapered as at 36 in the same manner as the upper end 16 of the tube or body portion 15 to provide a sharp or keen edge 37 at the upper end thereof. This construction does not provide the corners 21 to effect the longitudinal cuts 27 and 28 in the radish and in order to effect this it is necessary to form on the tube or body portion 15' cutters for this purpose. Accordingly, use is made of a plurality of wing cutters 38 each having a sharp or keen upper edge 39 and which wing cutters 38 are suitably secured to the exterior of the tube or body portion 15 and which securing may take the form illustrated at 40.

The modified construction of Fig. 4 houses the spring 19 and plunger 20 which operate in exactly the same manner as above described with the wing cutter 38 effecting the cuts 27 and 28 in the radish portion 23. The said tube or body portion 15' is likewise provided at its lower end with outwardly disposed lugs 34 and 35 for reception in the T slot of the base 18.

The modification illustrated in Fig. 7 is an extremely simple form and is provided with no plunger 20 or other ejecting means. This form of the radish cutter or implement has its tube or body portion in the form of a truncated cone 41 having the lower end of the tube outwardly flared as at 42 to provide a base flange. The small or upper end of the truncated cone may be left round or circular as illustrated in Fig. 4 or may be formed to have a rectangular cross section as in Fig. 1, and it is latter cross section that is illustrated, with the upper end of the tube or body portion 41 tapered to provide a keen or sharp edge 43. In this particular form dependence may be placed on the corners 44 to effect the vertical cuts 27 and 28 in the radish but there is preferably provided wing cutters 45 similar to the wing cutters 38 and each of which has its upper end sharpened as at 46. In operation the same use is made of the cutter of Fig. 7 as above described in connection with Fig. 3. In this form, however, the radish must be manually pulled from the top of the body portion or tube 41 or the user may insert a finger within the tube body portion and push the radish, instead of having the radish substantially automatically ejected by the plunger 20 and spring 19.

It has been found that when using the form of the radish cutter in Fig. 7, the radish is not always pushed directly downwardly resulting in the petals 30 having dissimilar thickness. This is generally the fault of the operator in allowing the radish to slightly tilt during the downward movement thereof. In order to overcome this, the modification illustrated in Figs. 8 and 9 provides a suitable guide means which consists of a centering pin 47 having its upper edge sharpened as at 48. The pin 47 is positioned substantially centrally of the open top of the tube or body portion 41 and is held in this position by a bridge 49 which has arms 50 and 51 secured by brazing, soldering, welding, moulding or the like within the tube or body portion 41.

The use of the modification in Figs. 8 and 9 is exactly the same as above described, the guide pin 47 however, assisting in causing the direct downward movement of the radish or permitting it to tilt as might be the case without the guide.

The modification illustrated in Fig. 10 is the same cutter or implement illustrated in Figs. 1, 2 and 3 with the addition of wing cutters 52 each having a sharp or keen upper edge 53 and located intermediate the corners 21 of the knives or keen edges 17. With this construction the radish is given eight petals instead of four as clearly illustrated in Fig. 10.

It will be understood that if desired certain of the additional wing cutters 52 may be eliminated to provide a different number of cuts and at the same time six wing cutters 38 may be employed with the cylindrical tube or body member 15' of the cutter illustrated in Figs. 4, 5 and 6. In any event on each of the cutters or implements there may be provided a plurality of cutting or slitting devices to provide the vertical or longitudinal cuts 27 and 28 in the radish.

The foregoing description of the radish cutter or implement of the present invention describes the operation and use as adapted to have the radish held by the user and moved or pushed relative to the keen edges or knives of the said cutter or implement. It has been found that substantially identical results can be obtained by properly supporting the radish and moving the cutter or implement relative thereto. In order to do this, however it is necessary that auxiliary means be provided for supporting the radish and this means is illustrated in Figs. 13 and 15.

Specifically, the supporting means for the radish comprise a block 56 having formed therethrough apertures 57 and 58. The apertures 57 and 58 may be formed to different diameters and the block 56 is countersunk from each side thereof to the said apertures as illustrated at 59 and 60, for the opposite ends of apertures 57, and at 61 and 62 for the aperture 58. It will be seen that the countersinks or wells 59 to 62 are of different depth and of different inclusive angles which are for the purpose of supporting different sizes, both diameter and length, of radish, since they are not grown to a uniform size. The support of a radish 24 is clearly illustrated in the right hand end of Fig. 15 in which the radish has its one end, with a portion of either the root or foilage, depending upon which it is desired to use, and indicated at 63, projecting into the selected aperture 57 or 58 of the other end trimmed off as at 64 to be engaged by the cutter or implement.

Any one of the cutters or implements may be employed with the radish support or cutting block 56, whether of the tubular style without any centering or guide means, or of a type having the centering or guide means whether as a pin or as a yieldable plunger.

The radish cutter or implement illustrated in Fig. 14 is of the frustro-conical tube type and indicated by the reference numeral 41' having however a circular cutting end 65 instead of the rectangular upper end as shown in Figs. 7 and 8. The cutter or implement of Fig. 14 is further illustrated as utilizing a eight wing cutter 45, each with a keen upper end 46 instead of just four cutters as disclosed in said Figs. 7 and 8.

Referring again to Fig. 15 which illustrates the cutter of Fig. 14 in operative position relative to the radish 24, it should be noted that pressure on the base or flange 42 thereof will push the keen open end 65 and wing cutters 45 through the radish until the said cutters engage the cutting block 56, and which position is illustrated in phantom lines at 66 in Fig. 15. From this it will be seen that the portion of the radish within the countersink or well 59—62 is not cut and is the portion of the radish that retains the petal like members 30 on the radish around the center 29 thereof. A finished radish as cut or supplied by the cutter or implement of Fig. 14 is illustrated in Fig. 16.

It may be desirable to cut or form the center 29 to have a design therein or to simulate inside petals of the so called "rose." In order to do this a cutting device may be secured to the plunger 20 of either of the forms illustrated in Figs. 1 to 6 inclusive. It will be understood that this center cutting or forming device may take any suitable or desirable form.

As illustrated in Figs. 17, 18 and 19 the radish center portion 29 cutting or forming device may consist of upstanding cutters or knives 67, 68, 69 and 70 which radiate from one another. Said knives are preferably made of somewhat thicker material than the wing cutters or blades 38, and the cutters or knives 67 to 70, inclusive have their upper ends sharpened to provide cutters or knives that are perceptibly wedge shaped in vertical cross section. By this construction a perceptibly wider cut 71 is provided than the cuts 27 and 28 resulting from the wing cutters 38 or the sharp points or ends 21 at the ends of the cutting edges 17. As will be seen in Fig. 19 and by providing four blades or cutters 67 to 70 inclusive the radish center portion 29, is at its outer end, divided into four sections 72, 73, 74 and 75.

It is not desirable that the cuts 71 from the cutter or blades 67 to 70 inclusive be as deep as the cuts 27 and 28 wherefore the said blades 67 to 70 inclusive project only a limited distance above the upper end of the tubular body of the cutter or implement. It will be understood that the said cutters or knives 67 to 70 inclusive cut into the radish only until the end of the radish engages the plunger 20 whereupon said knives 67 to 70 inclusive move as a unit with the radish into the interior of the tubular body member. It will also be understood that the said knives or cutters 67 to 70 inclusive take the place of the centering and non-slip pin 54 as above described.

An important constructional feature of the invention is that the internal dimensions of the body member or tube be greater than the internal dimension of the keen upper end whereby the radish center 29, after passing the keen upper end of the tube or body member is not in contact with the said tube or body member. In each of the modifications wherein a conical tube is employed this automatically results while in the modifications utilizing a cylindrical body member or tube this result is obtained by slightly inwardly disposing or bending the upper end, including the keen or cutting edge, of the said tube or body member.

The parts of the several modifications may be made from any kind or type of material such as metal, plastic or a combination of metal and plastic. The parts may also be cast, stamped, or molded depending on the type or kind of material used in their formation.

From the foregoing it is now believed evident that there has been provided a radish cutter or implement that eliminates the difficulty heretofore experienced and that the radish cutter or implement otherwise accomplishes the objects initially set forth.

What is claimed is:

1. As an article of manufacture a radish cutter comprising a hollow upstanding body member in the form of a tube having an open upper end of rectangular cross section, the sides of the opening being sharpened with a sharp corner at each end of each side and relative to which open upper end of the body member a radish is moved for a portion of its length to form a solid center on the radish and said sharp corners radially slitting the radish outwardly of the solid center to form leaves or petals laterally of the said solid center.

2. As an article of manufacture a radish cutter comprising a hollow upstanding body member in the form of a frustro-conical tube having its smaller end of circular cross section sharpened and relative to which a radish is moved for a portion of its length to form a projecting center, said frustro-conical tube having its larger end flanged to have pressure applied thereto for moving the cutter relative to the radish and wing cutters carried by the body each having a sharp edge substantially in the plane of the sharpened upper end and laterally projecting therefrom for radially and longitudinally cutting the portion of the radish surrounding the said center into sections to simulate leaves or petals.

3. As an article of manufacture a radish cutter comprising a hollow upstanding body member in the form of a frustro-conical tube having its smaller end sharpened and relative to which a radish is moved for a portion of its length to form a projecting center, said frustro-conical tube having its larger end flanged to have pressure applied thereto for moving the cutter relative to the radish, means on said body member associated with and substantially in the plane of the sharpened end radially and longitudinally cutting the portion of the radish surrounding the said center into sections to simulate leaves or petals, and guide means carried by the body member interiorly thereof for guiding the radish during its downward movement.

4. As an article of manufacture a radish cutter comprising a hollow upstanding body member in the form of a frustro-conical tube having its smaller end sharpened and relative to which a radish is moved for a portion of its length to form a projecting center, said frustro-conical tube having its larger end flanged to have pressure applied thereto for moving the cutter relative to the radish, means on said body member associated with and substantially in the plane of the sharpened end radially and longitudinally cutting the portion of the radish surrounding the said center into sections to simulate leaves or petals, and guide means carried by the body member interiorly thereof for guiding the radish during its downward movement, in the form of a sharpened spire substantially centrally of the body member for impaling the radish.

5. As an article of manufacture a radish cutter comprising a hollow upstanding body member having a sharp upper end relative to which a radish is moved for a portion of its length to form a center on the radish and leaves or petals laterally of said center, guide means substantially centrally of the body member for assisting in guiding the radish during its movement relative to the body member, comprising a yieldably mounted plunger movable under pressure employed in moving the radish relative to the body member, and which plunger upon release of pressure on the radish effects its ejection from the body member, and a base for the body member removably secured thereto.

6. In a device of the class described the combination of a supporting block having an aperture therethrough receiving and supporting a radish vertically thereon and with said radish having a portion thereof within the aperture and a radish cutter comprising a hollow tubular body portion having an open keen end adapted to be moved for a portion of its length substantially axially of the supported radish which has lateral dimensions greater than said corresponding lateral dimensions of the cutter body portion to provide a center in the radish free from the surrounding radish body portion, and a plurality of cutting means carried by the tubular body portion and substantially in the plane of the tubular body portion keen end for vertically slitting the surrounding body portion to simulate petals outwardly of the radish center, said movement of the radish cutter axially of the radish being limited by the engagement of the cutting means with the block so that the portion of the radish within the aperture remains uncut.

7. In a device of the class described the combination of a supporting block having an aperture therethrough receiving and supporting a radish vertically thereon, and with said radish having a portion thereof within the aperture and a radish cutter comprising a hollow tubular body portion having an open keen end adapted to be moved for a portion of its length substantially axially of the supported radish which has lateral dimensions greater than the said corresponding lateral dimensions of the cutter body portion to provide a center in the radish free from the surrounding radish body portion, a plurality of cutting means carried by the tubular body portion and substantially in the plane of the tubular body portion keen end for vertically slitting the surrounding body portion to simulate petals outwardly of the radish center, said movement of the radish cutter axially of the radish being limited by the engagement of the cutting means with the block so that the portion of the radish within the aperture remains uncut and a yieldable plunger centrally of the tubular body portion for ejecting the radish from the cutter body portion upon release of cutting pressure.

8. In a device of the class described the combination of a supporting block for supporting a radish vertically thereon, and a radish cutter comprising a hollow tubular body portion having an open keen end adapted to be moved for a portion of its length substantially axially of the supported radish which has lateral dimensions greater than the said corresponding lateral dimensions of the cutter body portion to provide a center in the radish free from the surrounding radish body portion, a plurality of cutting means associated with the keen end of the tubular body portion for vertically slitting the surrounding body portion to simulate petals outwardly of the radish center, a yieldable plunger centrally of the tubular body portion for ejecting the radish from the cutter body portion upon release of cutting pressure, and means carried by said plunger for transversely slitting or forming the radish center.

9. As an article of manufacture a radish cutter comprising a hollow upstanding body member having a sharp upper end relative to which a radish is moved for a portion of its length to form a center on the radish and leaves or petals laterally of said center, guide means substantially centrally of the body member for assisting in guiding the radish during its movement relative to the body member, comprising a yieldably mounted plunger moveable under pressure employed in moving the radish and body member relative to one another, and which plunger upon release of pressure on the radish effects its ejection from the body member, and means carried by the plunger for slitting or forming the radish center.

10. As an article of manufacture a radish cutter comprising a hollow upstanding body member having a sharp upper end relative to which a radish is moved for a portion of its length to form a center on the radish and leaves or petals laterally of said center, guide means substantially centrally of the body member for assisting in guiding the radish during its movement relative to the body member, comprising a yieldably mounted plunger movable under pressure employed in moving the radish and body member relative to one another, and which plunger upon release of pressure on the radish effects its ejection from the body member, means carried by the plunger for slitting or forming the radish center, and a base for the body member removably secured thereto.

11. As an article of manufacture a radish cutter comprising a tubular body member having a hollow core with one end sharpened and the other end flanged, said tubular body member being adapted through its sharpened end to enter one end of a radish while the radish cutter is supported on its flanged end and said tubular body member being adapted to penetrate the radish for a portion of its length to form a center projecting from the remaining end of the radish, means carried by the body member substantially in the plane of the sharpened end of the tubular body member radially slitting the portion of the radish outwardly of the center to form leaves or petals laterally of the said center, and a base removably secured to the flanged lower end of the tubular body member.

12. As an article of manufacture a radish cutter comprising a frustro-conical tubular body member having a hollow core with its smaller end sharpened and its larger end flanged, said tubular body member being adapted through its sharpened end to enter one end of a radish while the radish cutter is supported on its flanged end and said tubular body member being adapted to penetrate the radish for a portion of its length to form a center projecting from the remaining end of the radish, and radially projecting wing cutters carried by the body member substantially in the plane of the sharpened end radially slitting the portion of the radish outwardly of the center to form leaves or petals laterally of said center.

13. As an article of manufacture a radish cutter comprising a frustro-conical tubular body member having a hollow core with its smaller end sharpened and its larger end flanged, said tubular body member being adapted through its sharpened end to enter one end of a radish while the radish cutter is supported on its flanged end and said tubular body member being adapted to penetrate the radish for a portion of its length to form a center projecting from the remaining end of the radish, radially projecting wing cutters carried by the body member substantially in the plane of the sharpened end radially slitting the portion of the radish outwardly of the center to form leaves or petals laterally of said center, and a base removably secured to the lower end of the tubular body member.

14. As an article of manufacture a radish cutter comprising a tubular body member having a hollow core with one end sharpened and the other end flanged, said tubular body member being adapted through its sharpened end to enter one end of a radish while the radish cutter is supported on its flanged end and said tubular body member being adapted to penetrate the radish for a portion of its length to form a center projecting from the remaining end of the radish, means carried by the body member substantially in the plane of the sharpened end of the tubular body member radially slitting the portion of the radish outwardly of the center to form leaves or petals laterally of the said center, and guide means substantially centrally of the body member for assisting in guiding the radish during its movement relative to the body member, comprising a yieldably mounted plunger movable under pressure employed in moving th radish and body member relative to one another, and which plunger upon release of pressure on the radish effects its ejection from the body member.

15. As an article of manufacture a radish cutter comprising a frustro-conical tubular body member having its smaller end sharpened and its larger end flanged, said tubular body member being adapted through its sharpened end to enter one end of a radish while the radish cutter is supported on its flanged end and said tubular body member being adapted to penetrate the radish for a portion of its length to form a center projecting from the remaining end of the radish, and means carried by the body member substantially in the plane of the sharp end for radially slitting the radish outwardly of the said center to form leaves or petals laterally of the center.

References Cited in the file of this patent

UNITED STATES PATENTS

| Number | Name | Date |
|---|---|---|
| 48,149 | Bennett | June 13, 1865 |
| 236,477 | Baldwin | Jan. 11, 1881 |
| 564,913 | Brannen | July 28, 1896 |
| 1,577,953 | Carter | Mar. 23, 1926 |
| 2,150,046 | Bard | Mar. 7, 1939 |
| 2,238,971 | Carroll et al. | Apr. 22, 1941 |
| 2,297,177 | Tiffany | Sept. 29, 1942 |
| 2,321,881 | Waelty | June 15, 1943 |
| 2,383,814 | Richardson | Aug. 29, 1945 |
| 2,468,282 | Wood | Apr. 26, 1949 |
| 2,479,145 | Werth | Aug. 16, 1949 |
| 2,625,972 | Torres | Jan. 20, 1953 |